Nov. 5, 1940.   H. S. BOLES ET AL   2,220,704
OVERHEAD WELDING GANTRY
Filed May 21, 1937    6 Sheets-Sheet 6
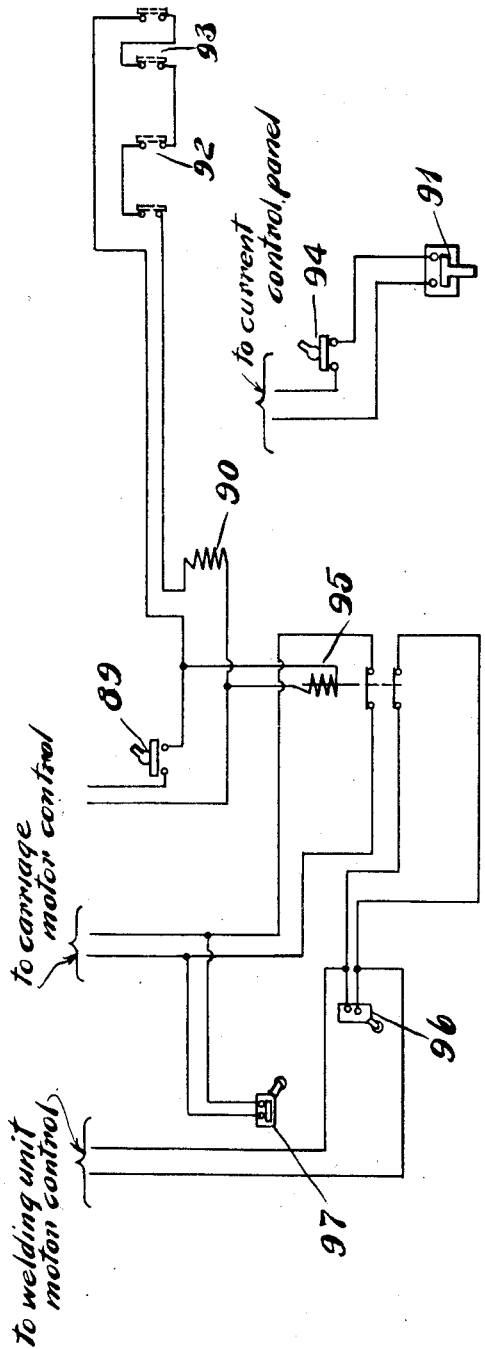
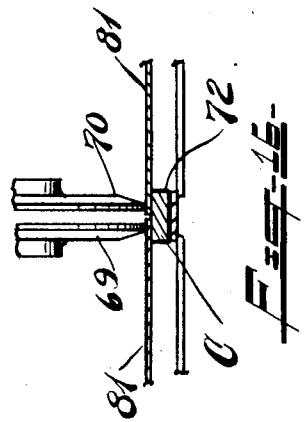
Inventors.
Harry S. Boles and
Howard C. Cogan.
BY Frank C. Farman.
ATTORNEY.

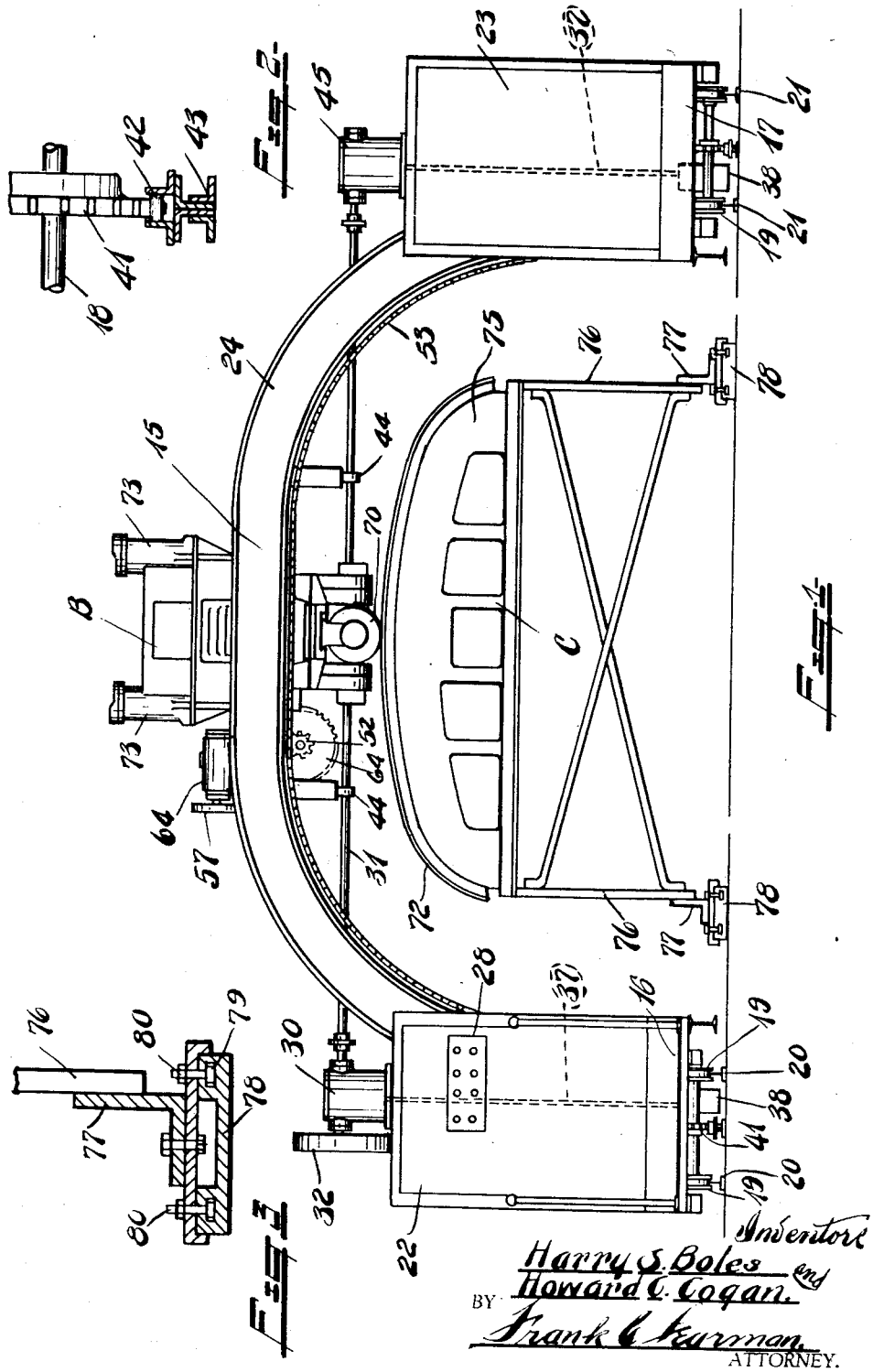

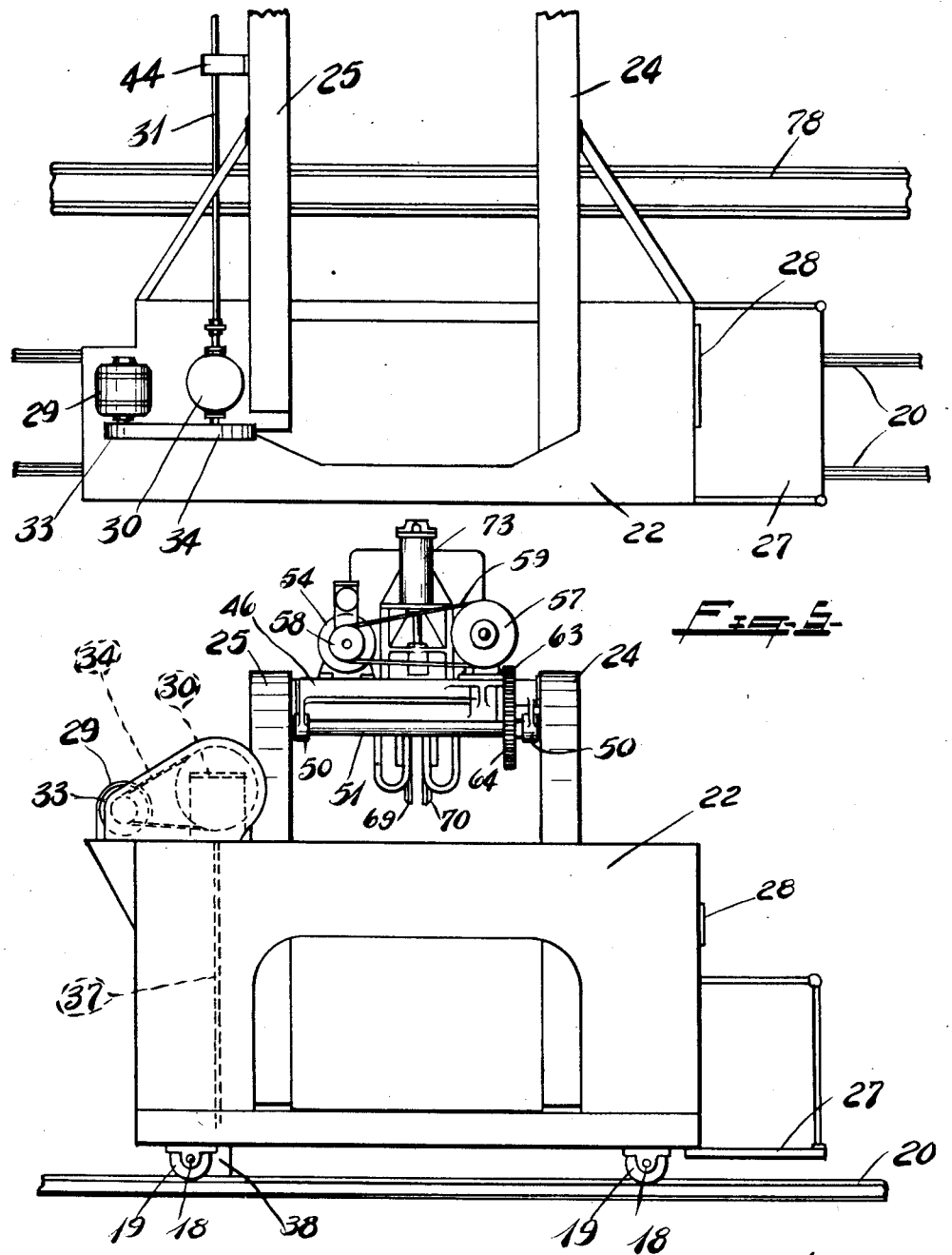

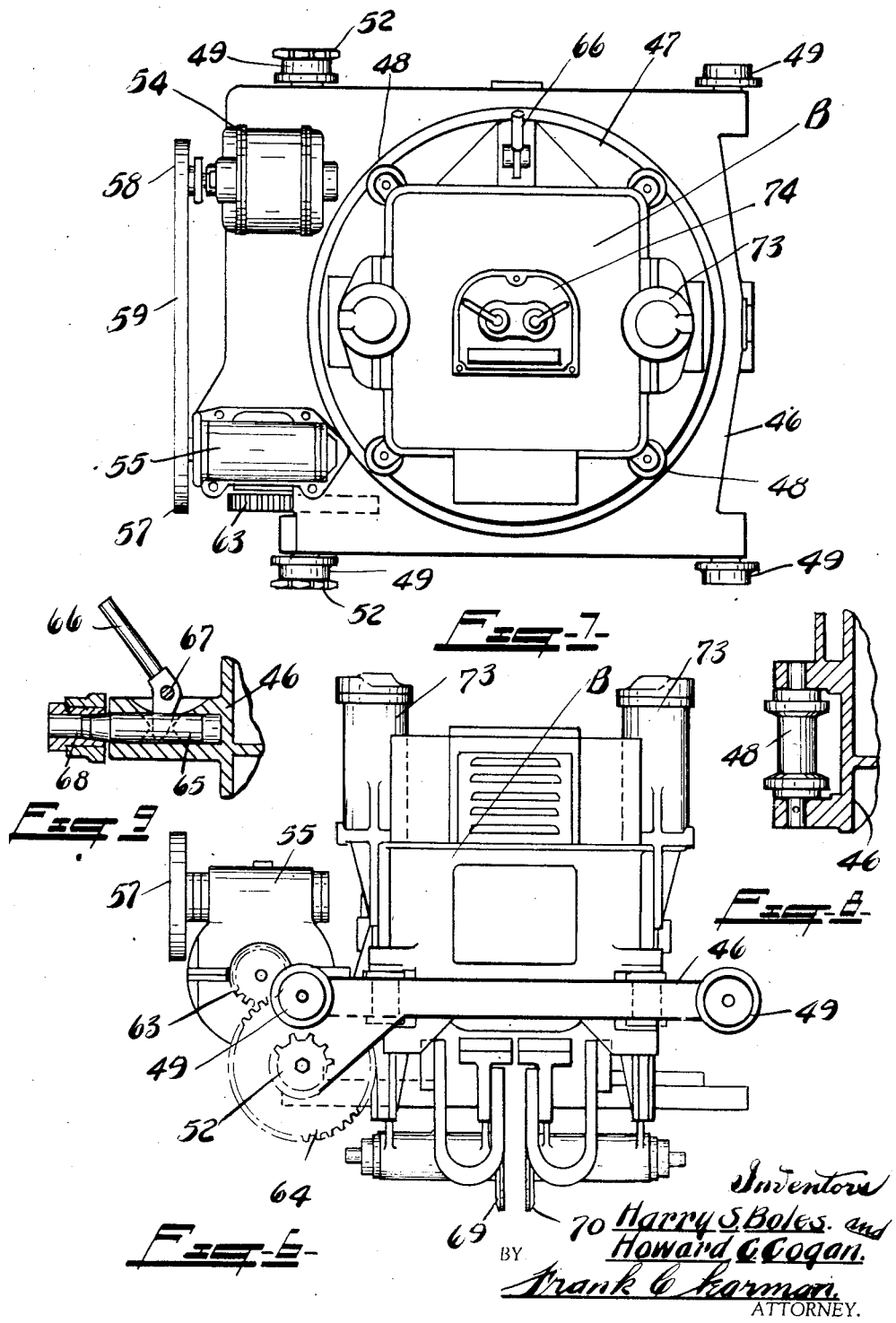

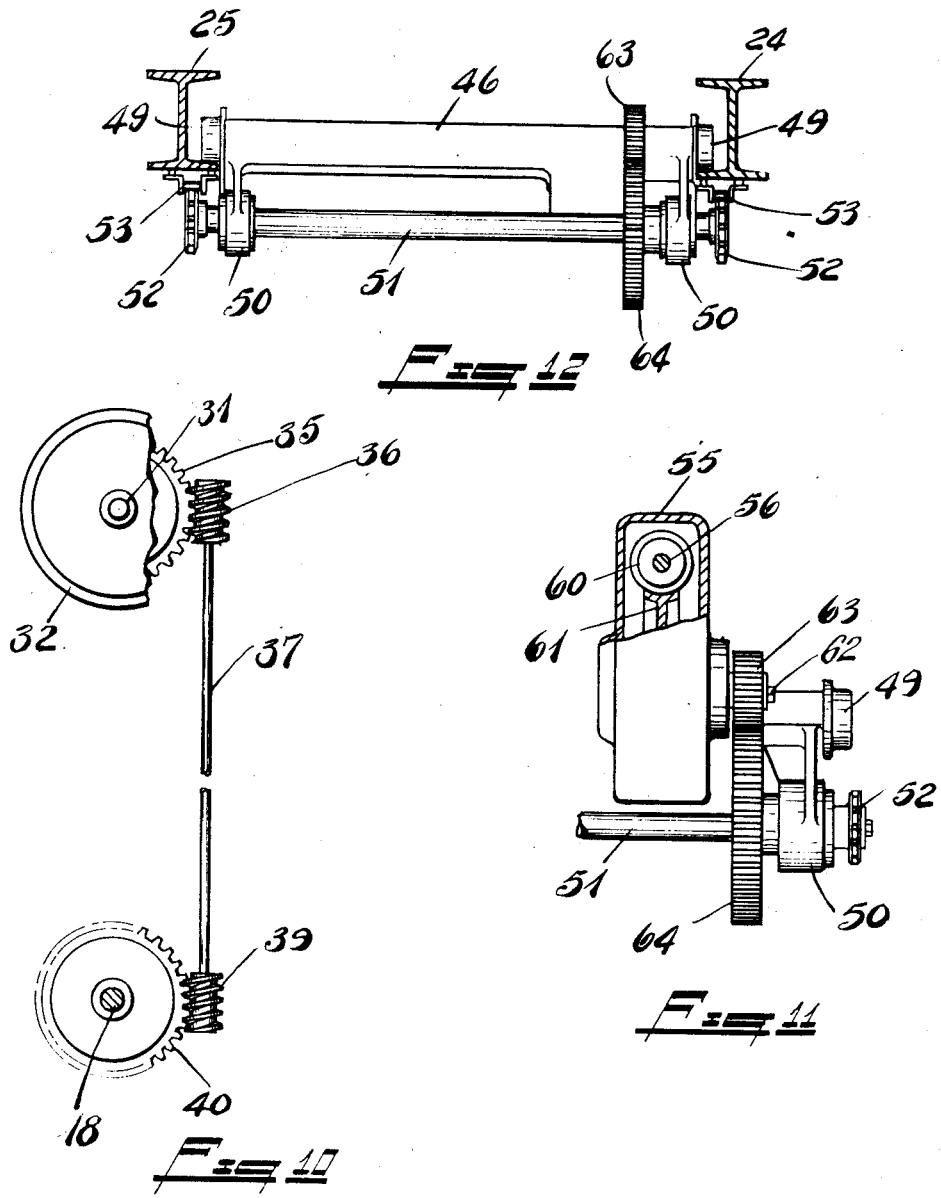

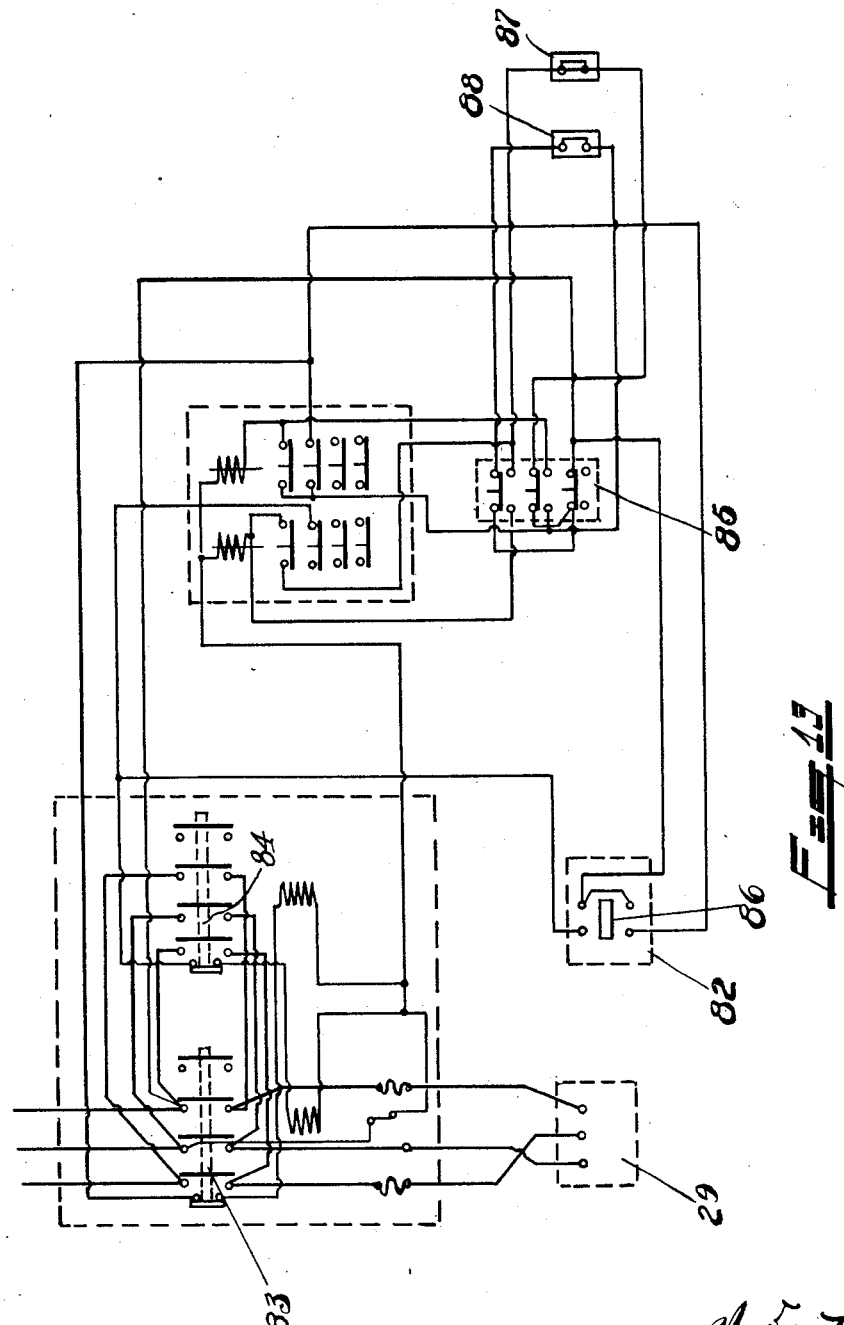

Patented Nov. 5, 1940

2,220,704

UNITED STATES PATENT OFFICE 2,220,704

OVERHEAD WELDING GANTRY

Harry S. Boles, Chicago, Ill., and Howard C. Cogan, Bay City, Mich.

Application May 21, 1937, Serial No. 143,986

8 Claims. (Cl. 219—4)

This invention relates to welding apparatus and more particularly to an overhead welding mechanism for welding the framework and top sheets of steel cars, coaches, tractors, ships, containers, and railroad equipment in general.

One of the prime objects of the invention resides in the provision of a self-propelled, traveling gantry equipped with a welding head mounted for travel thereon, for progressively welding plates and/or members as the welding unit and gantry move.

Another object of the invention is to provide means for guiding the welding unit in a definite orbit of travel to conform to the general contour of the sheets or members being welded.

A further object is to provide a self-propelled gantry having a revolvably mounted welding head or unit mounted and arranged whereby it can be easily and quickly adjusted for welding either longitudinal seams or cross seams, thereby providing flexibility of operation and reducing the labor incident to carrying on the work.

A still further object is to provide a portable overhead welding gantry including a welding head or unit movable in a direction transverse to the direction of travel of the gantry for welding curved or straight cross seams, said unit being adjustable and held stationary on the gantry for welding longitudinal seams as the gantry travels.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction, without departing from the spirit, or sacrificing any of the advantages of the invention.

In the drawings:

Fig. 1 is a front elevational view of the portable welding device together with the welding fixture, showing the device set for welding cross seams.

Fig. 2 is an enlarged fragmentary sectional detail of the gantry drive sprocket and chain.

Fig. 3 is an enlarged fragmentary sectional detail showing one leg of the welding fixture associated with the track.

Fig. 4 is a side elevational view of the apparatus.

Fig. 5 is a fragmentary top plan view of one side of the gantry.

Fig. 6 is an enlarged front view of the welding unit.

Fig. 7 is a top plan view of the welding unit.

Fig. 8 is an enlarged fragmentary sectional detail showing one of the flanged rollers of the welding unit.

Fig. 9 is an enlarged sectional detail showing the locking means for locking the welding unit in position on the carriage.

Fig. 10 is a top view of a portion of the gantry drive mechanism.

Fig. 11 is an enlarged fragmentary, part sectional detail view of the welding unit carriage drive mechanism.

Fig. 12 is an end view of the welding unit carriage showing the same mounted on the gantry bridge.

Fig. 13 is a schematic wiring diagram of the motor control.

Fig. 14 is a schematic wiring diagram of the auxiliary control.

Fig. 15 is a schematic wiring diagram, showing the automatic pressure switch connection to the welding control panel.

Fig. 16 is a fragmentary sectional detail of the fixture, welding rolls, and "work."

In order to weld large structures such as railroad cars, ships, houses, etc., during construction, it becomes necessary to bring the welding machine to the "work," or the "work" to the welding machine. The curvature of the seams or joints also presents difficulties, and these difficulties we have overcome by providing a portable gantry including an adjustable, revolvably mounted welding unit, mounted for travel on the gantry, so that the welding head can be automatically moved along the "work" to weld cross seams, or be "set" in proper position on the gantry to weld longitudinal seams as the gantry travels.

In accordance with the present invention a gantry structure is provided having power actuated means for moving the gantry along a system of parallel tracks, which tracks are provided with limit switches for limiting the travel of the gantry in either direction.

Overhead beams form a bridge which spans the gantry structure, and the welding unit carriage is mounted to travel on this bridge to progressively weld the cross seams, limit switches being also provided for limiting the travel of the carriage on the bridge.

In the present instance an apparatus is shown designed for use in the fabrication of railroad cars, and more particularly the top sheets thereof, the numeral 15 indicating the self-propelled gantry structure, which includes spaced apart trucks 16 and 17 respectively each truck comprising longitudinally spaced axle members 18 having track engaging wheels 19 mounted thereon, said wheels travelling on a system of parallel tracks 20 and 21 in the usual manner.

Fabricated superstructures or housings 22 and 23 respectively are mounted on the trucks 16 and 17, and suitably braced beams 24 and 25 form the bridge which connects the trucks to form a portable unit. Truck 16 is provided with a platform 27 on which the gantry operator is stationed for controlling the apparatus. A control panel 28 is mounted on the housing 22 within easy reach of the operator and by means of which he can control the automatic movement of the gantry on the tracks, and also control the transverse or cross travel of the welding unit on the bridge, and in a manner to be presently described.

A suitable motor 29 is mounted on the housing 22, and a gear reduction unit 30 is located directly adjacent said motor. A transversely disposed shaft 31 projects from said unit 30, and a pulley 32 is mounted thereon. A similar pulley 33 is mounted on the motor, and a drive belt 34 is trained over these pulleys and serves to transmit motion to the shaft 31.

A worm wheel 35 is mounted on the shaft 31, said worm wheel meshing with and driving a worm 36 on a vertically disposed shaft 37 which shaft depends from the housing. The lower end of shaft 31 is journaled in an axle housing 38 provided on the axle 18. A worm 39 is mounted on the lower end of the shaft 37, meshing with a worm wheel 40 mounted on the axle 18. A sprocket 41 is also mounted on said axle and engages a stationary chain 42 which is mounted on the chain support 43.

The opposite truck 17 is driven in exactly the same manner, and from the same source of power as the truck 16, through shaft 31 journaled in bearings 44 depending from the bridge beam 25 and extending into a gear housing 45 mounted on truck 17. It will be obvious that the gantry will be moved and will travel on tracks 20 and 21 when the sprockets 41 are driven.

The ends of the beams 24 and 25 are secured in the housings 22 and 23 in any approved manner, said beams being shaped to follow the general curvature of the "work" as clearly shown in Fig. 1 of the drawings. The flanges of said beams form a track on which the welding unit "B" is adapted to travel.

The welding unit travels in a direction transverse to the direction of travel of the gantry and includes a platform 46 formed with a centrally disposed opening 47, and a welding transformer B is suspended in said opening and is provided with flanged rollers 48 which engage and ride on the rim of the opening to revolvably support the transformer. Wheels 49 are journaled on the corners of the platform 46 in the usual manner and engage and ride on the flanges of the bridge beams. Bearings 50 are cast integral with, and depend from said platform 46, and a shaft 51 is journaled in said bearings. Sprockets 52 are provided on the ends of the shaft and engage stationary chains 53, which are in turn secured to the lower flange of the bridge beams in any approved manner.

The welding unit is driven by means of a reversible motor 54 which is mounted on the platform 46, and a gear housing 55 is mounted adjacent thereto, a worm shaft 56 projecting from said housing, and a pulley 57 is mounted thereon, a similar pulley 58 being provided on said motor, and a belt 59 is trained over these pulleys for driving said worm shaft. A worm 60 is mounted on shaft 56, and meshes with and drives worm wheel 61 which is mounted on the shaft 62. Shaft 62 is journaled in the housing, a spur gear 63 being mounted on one end of said shaft and meshing with and driving a gear 64 mounted on the shaft 51, and which also carries the sprockets which engage the chains 53, it, therefore, following that as the shaft 51 is driven, the welding unit carriage will move on the bridge 10 of the gantry in the direction desired by the operator.

Suitable locking mechanism (see Fig. 9) serves to secure the transformer and comprises welding head assembly in "set" position, and a pin 66 slidably mounted on the transformer shell, a lever 66 being pivotally mounted at 67 with its lower end engaging said pin, and suitable openings 68 are provided in the platform, the lever being adjustable to move the pin into or out of engagement with the opening as desired. The transformer and welding head assembly is revolvable on the platform to bring the welding rolls 69 and 70 to proper predetermined position for welding either a cross or longitudinal seam, and when the pin 65 is retracted the entire unit can be "set" as desired, and then locked in its "set" position.

The welding rolls 69 and 70 are each adjustably mounted in a holder 71 and are connected to one side of the secondary circuits of the transformer, thereby permitting the use of a relatively short strip of copper bar 72 on the opposite side of the "work", which may be integral with the work holding fixture or jig "C" for making two seams simultaneously without any conventional, long secondary connection hooked on the opposite side of the "work", and it is not deemed necessary to describe this welding unit in detail, as it is of standard design. It will be seen that Figure 16 discloses a series welding method for welding roof sheets continuously. Applicants' device may be used in connection with any kind of a welding system, for instance as spot welding.

The welding rolls are moved vertically by means of air cylinders 73, which are adjustable for spacing in conventional manner, and the welding heat is adjustable through control of the usual heat regulator 74.

The "work" fixture or jig "C" is clearly shown in Fig. 1 of the drawings and comprises a plurality of spaced apart bents 75. The upper edge of each bent is of the exact curvature of the top of the car, each bent being provided with legs 76, and each leg terminates in a channel shaped shoe 77 which is adapted to be secured to a track 78, said track being formed with spaced apart, inverted T shaped grooves 79, which accommodate bolts 80 for securely anchoring the fixture to the track.

In practise the sheets 81 are placed on the fixture "C" and are clamped in position with their edges in abutting relation, and the welding unit is then "set" for welding the cross or longitudinal seams as above explained.

It will be noted that both motors have similar control circuits, (see Fig. 13) and include motors 29 and 82 respectively. Each circuit is of conventional forward and reversing magnetic starter type, the numerals 83 and 84 indicating the magnetic forward starter and the magnetic reversing starter respectively, and are operated through pushbutton station 85. An automatic braking condition is obtained through relay 86 which is mounted on and driven from the motor 82.

Limit switches 87 and 88 are provided for arresting the travel of the carriage, and when these switches are actuated the direction of rotation of the motor 82 is reversed, the relay 86 opens the circuit, and a quick braking stop is assured.

In Fig. 1 of the drawings is shown the welding unit set for welding cross seams, and assuming the machine to be ready for welding, the sequence of operation of the welding unit carriage travel over the bridge is as follows:

The operator first closes the switch 89 and the solenoid air valve 90 forces the welding rolls downwardly into engagement with the "work," and when each roll exerts equal and predetermined pressure on the "work" the automatic pressure switch 91 will close the welding current circuit through conventional control, the operator then actuates the starter, closing the motor circuit for the desired direction of travel, thus starting the welding stroke over the bridge. The movement of the carriage is automatically arrested at the predetermined end of the stroke by means of the limit switches 87 and 88, and limit switches 92 and 93 are also actuated for automatically raising the welding rolls from the "work," and upon release of pressure in the cylinders 73, the pressure switch 91 automatically opens to disconnect the welding circuit. The motor 29 is then energized to move the gantry to the next point of weld, and the operation is repeated.

For welding longitudinal seams, the welding unit must be rotated to bring the welding rolls to required position, the operator first swings the lever 66 to release the welding unit, which is then rotated ninety degrees and locked in "set" position by swinging the locking lever 66 to original locked position. The machine is now ready for welding longitudinal seams. The sequence of operation is exactly the same as above described for the cross seams, excepting that the motor 29, which propels the gantry, is energized instead of the carriage motor 54. An auxiliary switch 94 is provided for disconnecting the welding current for "work" set-up and trial.

To prevent the welding rolls traveling crosswise of the "work" when in down position a safety circuit is provided (see Fig. 14) including the relay 95 and limit switches 96 and 97 respectively, these are connected to both motor control circuits, so that cross seams or longitudinal seams cannot be started unless welding rolls are set in their respective correct welding position.

The piping for the water cooling system is not shown or described, nor are the air lines for supplying air to the air cylinders etc. as they form no part of the present invention.

While in the present instance we have shown the apparatus equipped with welding rolls for seam welding, it will be understood that electrodes may be substituted for the rolls and that continuous welding lines may be formed by merely overlapping the spot welds, or intermittent spot welds of any desired spacing.

From the foregoing, it will be apparent that we have devised an improved welding apparatus of great flexibility, and by means of which large articles may be economically welded.

What we claim is:

1. A welding machine comprising wheel supported trucks, spaced arching beams connecting said trucks and adapted to be moved over stationary arched work during a welding operation, means for simultaneously traversing the trucks through the rotation of their wheels, said means being controllable from one of said trucks and a welding carriage mounted on the beams and adapted to move longitudinally thereon to welding positions, means mounted on the welding carriage and cooperating with the beams for moving the carriage, said last named means comprising a driven gear carried by the carriage and a rack carried by one of the beams and with which the gear meshes.

2. A device as set forth in claim 1 including supporting wheels for the carriage, trackways in the adjacent sides of the beams and in which the supporting wheels are mounted, a rack carried by the under side of each of the beams, a motor mounted on the carriage, a reduction gear train connection between the carriage and the rack bars and a driving connection between the reduction gear and the motor.

3. The combination with a traversing welding apparatus having spaced arched beams adapted to arch work, of a welding head carriage mounted between the beams, supporting wheels carried by the carriage, the inner sides of the beams having trackways on which the wheels travel, of means for positively moving said carriage on the beams throughout their length, said means comprising a motor carried by the carriage and movable therewith, rack bars carried by the under sides of the beams, a drive shaft carried by the carriage, drive pinions carried by the ends of the drive shaft and meshing with the rack bars, a reduction gearing carried by the carriage and driving the drive shaft and a drive connection between the motor and reduction gearing.

4. A device as set forth in claim 3 including a rotatable welding head extending through the carriage and having bearings therein, means for holding said carriage in various rotative adjusted positions and a combined seam and spot welding element carried by said head.

5. The combination with a traversing wheel supported welding gantry adapted to move over a transversely curved welding surface, of arched beams carried by the gantry and conforming to the curvature of the surface to be welded and a welding carriage between the beams and movably guided therein, a controllable gear drive connection between the carriage and beams, welding elements supported by the carriage, said carriage being guided in its movement whereby the welding elements will follow the contour of the work and beams with the carriage at a uniform distance from the work.

6. The combination with a welding machine comprising a travelling gantry having spaced beams upwardly arched with their ends curving downwardly and outwardly to opposite sides of work, a wheel supported welding carriage mounted on said beams and guided in the beams for following the contour of the work throughout the length of the beams, of means for positively moving and guiding said carriage in its movement over the beams, said means comprising rack bars carried by the beams and following the contour thereof, a driven gear carried by the carriage and meshing with one of the rack bars and means carried by the carriage and having driving connection with the driven gear.

7. The combination with a welding machine comprising a gantry adapted to be disposed adjacent work, a travelling welding carriage mounted on said gantry, work engaging welding elements carried by said carriage and means cooperating with said welding elements whereby said welding elements may be held in continuous engagement with the work at a uniform predetermined pressure for seam welding or for intermittent engagement with the work for spot welding.

8. The combination with a welding machine comprising a travelling gantry arching work, a welding carriage mounted on said gantry, means for moving said carriage transversely of the work, said carriage being movable longitudinal of the work by the movement of the gantry, of a pivoted welding head mounted in said welding carriage, welding electrodes carried by said pivoted welding head and adapted to follow transverse or longitudinal seams on the work, said welding elements being movable towards and away from the work, means for controlling the movement of the welding elements in relation to the work whereby a continuous seam welding may be accomplished or an intermittent spot welding operation.

HARRY S. BOLES.
HOWARD C. COGAN.